July 13, 1954
R. E. CUNNINGHAM
2,683,767
POTTING OF ELECTRICAL COMPONENTS
Filed Aug. 27, 1953
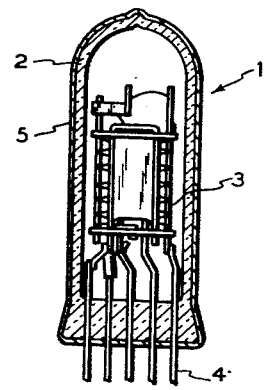
_Fig.1_
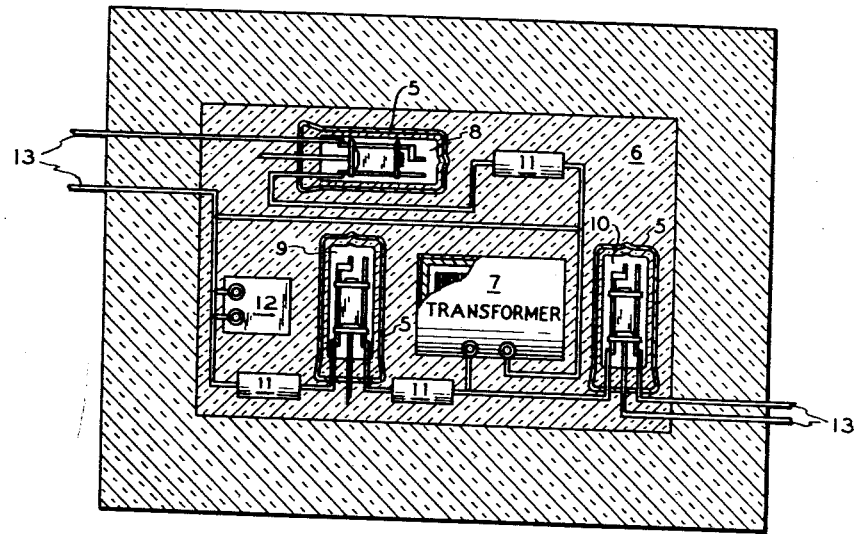
_Fig.2_
INVENTOR
RUSSELL EDWARD CUNNINGHAM
BY *Hyman Hurwitz*
ATTORNEY Patented July 13, 1954

2,683,767

UNITED STATES PATENT OFFICE 2,683,767

POTTING OF ELECTRICAL COMPONENTS

Russell E. Cunningham, Washington, D. C., assignor to Melpar, Inc., Alexandria, Va., a corporation of New York Application August 27, 1953, Serial No. 376,955

2 Claims. (Cl. 174—52)

This application is a continuation-in-part of my application for U. S. patent Serial #43,437, filed August 10, 1948, for Potting Electrical Components.

This invention relates broadly to the encapsulation within a casting of resinous plastic material, of electrical components generally, and particularly to the encapsulation of fragile electrical components, such as miniature vacuum tubes and the like, for the purpose of protecting the latter against mechanical shock, moisture, fungus and various other effects deleterious to the life and proper functioning of the electrical components.

Broadly described, the present invention involves encapsulation of electrical components, such as electronic vacuum tubes, transistors, metallic bodies, or the like, in polyester resin or other resins which are shockproof, rigid, and relatively non-hygroscopic, but which have a contractibility different from that of the electrical components during cooling or curing of the resinous compound. In general, it has been found that the resinous compounds utilized in fabricating a resinous casting, and which are commercially available from a number of sources, as polyester casting resins, contract during cooling and curing, and in relation to the contraction of glass or metal, contract volumetrically to a different extent than the latter. The difference in contractibility causes mechanical damage to electrical components, and especially to those which may incorporate glass in their structure, and in the case of miniature vacuum tubes in particular, results in leakage of gas into the envelope of the tube, destroying the operability of the tube. In the case of metallic bodies, the contraction of the metal is less than that of the casting, resulting in a defective casting rather than in damage to the metallic bodies.

It is well known, in accordance with prior art practices, to seal vacuum tubes or other fragile electrical components within an envelope or container, which may take the form of a cylinder or sleeve, the container being formed of a relatively resilient plastic, prior to insertion of the components into the resinous casting material, in order that the envelope or container may absorb the stresses due to the contraction of the resinous material during casting, thus avoiding damage to the components or defects in the casting. Various difficulties are found to exist, in practice, in the procedure, as applied particularly to miniature vacuum tubes. Insertion of the vacuum tubes into the envelopes or containers is accompanied, in the first place, by considerable possibility of damage to the tubes, and the insertion requires very great care and accordingly consumes considerable time. Very often, when damage has occurred, this is not ascertainable until the potting process has been completed, so that considerable economic waste is involved in proceeding according to the known methods.

The present invention involves the coating of the vacuum tubes, or other electrical components, with a resilient coating, which has the resilience requisite to enable the coating to absorb the stresses generated by the contraction of the main potting compound during polymerization and cooling of the latter, as well as the stresses generated by extreme temperature variations, after the main potting compound has solidified.

It is a primary virtue of the present invention that the coating of the electrical components may be accomplished by a simple dipping process which requires relatively little time to accomplish, and which has been found, in practical manufacturing operations, to be practically 100% effective in protecting the fragile electrical components during potting, yet to involve substantially no possibility of damaging the components during the process of applying the protective coating thereto. The initial protective coating may, itself, be made of a plastic material, which is over a wide range of temperatures adherent, dry, liquid impervious, capable of forming a thin smooth coating, and compatible with the main casting resin. Since the protective coating is formed in a relatively thin coating, and is, in any event, resilient, no damage to the vacuum tubes or other electrical components results from the formation of the initial protective coating on the components. The coated components may then be inserted in the main polymerizable casting compound, which may comprise resinous material of the polyester type. The curing and cooling of the casting compound will have no mechanical effect upon the electrical components themselves, since the resilient plastic coating takes up the shrinkage of the casting compound and does not pass on stresses or strains to the coated electrical components.

Likewise, where the casting compound contracts more slowly than the potted element during cooling and polymerization or curing, the compound will not pull away from the latter to form a defective casting.

By proper choice of the compositon of the protective coating, with respect to the chemical constitution of the main potting compound, polymerization of the latter is not inhibited at the inter-face between the main casting and the resilient plastic of the coating, which serves to reduce stresses at or adjacent to the inter-face, and results in a smooth and uniform coating, not only in portions of the casting which are remote from the electrical components, but also at and adjacent thereto. Proper choice requires that the protective coating be composed of a material which is chemically inert with respect to the main casting compound or compatible therewith.

The use of a protective coating fabricated of a plastic which is compatible with the main potting compound is especially important in the present invention. It is not feasible to utilize, as a protective coating, such substances as natural rubber or latex, or the like, which appear to have the requisite mechanical properties, since such materials, being non-compatible with the resinous compound forming the casting, prevent polymerization of the latter over a wide volume adjacent to the natural rubber or latex, producing an unsatisfactory casting.

It is, accordingly, a broad object of the present invention to provide a novel method for potting fragile objects within a mass of shockproof, rigid and relatively non-hygroscopic material, such as polyester type casting resin.

It is a more specific object of the present invention to provide a method of potting electronic vacuum tubes or other fragile electrical components in polyester resins, or other resins which are shockproof, rigid and relatively non-hygroscopic, in a rapid and efficient manner, and with substantially no spoilage.

It is, more specifically, an object of the present invention to provide, as a new article of manufacture, electric components in potted form, cast within a mass of resinous material, and particularly resinous material which initially exists hot in the liquid state, and which is converted by cooling to the solid state, wherein the components are provided with one or more adherent protective layers of a resilient plastic material which is compatible with the material of the main casting. The resilient plastic material absorbs stresses due to contraction of the main body of the casting during cooling, in order to protect the electrical components mechanically, and the protective coating is compatible with the main casting, or chemically inert with respect thereto, so that the main casting is smooth and uniform in all parts thereof, including parts thereof which are at or adjacent to the inter-face of the protective coating and the main body of the casting.

Resinous castings constructed in accordance with the present invention are smooth and continuous throughout, having no air gaps or spaces, particularly at the inter-face between the protective coating and the main resinous casting, whereby electrical leakage between the various parts of the electrical components when subjected to electrical stresses is completely obviated.

An important feature of the present invention is the utilization of coating materials which may be applied by a simple procedure, suitable for large scale production, without waste, and which further, retain their physical and chemical properties at extremely low temperatures, and at extremely high temperatures. My invention finds particular application in military electronic equipment, which is subject to extreme ranges of temperature, and may attain such extreme ranges in short periods of time and repeatedly. The coating materials which I employ have been found to retain their physical and chemical properties unimpaired when employed within polyester type castings, at temperatures as low as −65° C. and as high as 300° C. and higher, and are virtually unaffected by rapid variations over this range of temperature, occurring daily over periods of years.

The novel features which are characteristic of my invention are set forth in the appended claims. The invention itself, however, will best be understood by reference to the following specification, when considered in connection with the accompanying drawings, in which:

Figure 1 is a longitudinal view taken in section and showing a composite structure comprising a miniature electronic vacuum tube surrounded by a cushioning coating, the latter being in turn surrounded by a resinous casting; and, Figure 2 is a view in longitudinal section showing a subassembly of electrical components, some of which have been provided with a protective and resilient coating prior to casting within a considerable mass of resinous material.

Two slightly different methods of dipping electrical components in polyvinyl chloride, prior to casting, are provided in accordance with the present invention. Both methods produce essentially the same result. However, the methods may be applied most advantageously in connection with the dipping of different types of components. Some types of electrical components are relatively temperature sensitive, or subject to damage when raised to a relatively moderate temperature, say 200° F., whereas other types are relatively temperature insensitive. The differences in dipping process are required by these differences in characteristics of the elements or units which are to be dipped.

In dipping temperature insensitive components or units, in polyvinyl chloride, the components are first cleaned and freed of grease, and then heated to a temperature in the range approximately 70° to 324° F., depending on the thickness of the ultimate coating which is desired, the higher temperatures resulting in a greater thickness of coating in a given dipping time. For most purposes it has been found that a coating having a thickness of from 3 to 5 thousandths of an inch is adequate, and for this purpose a temperature intermediate the values 70° to 325° F., say about 200° F., may be employed. The component, after being cleaned and freed of grease and heated to the indicated temperature, is dipped into the liquid plastic, the latter comprising polyvinyl chloride formulated with a suitable plasticizer and heat stabilizer, in one specific application of the invention, which is sold commercially under the trade name "Geon" 100×210. The component is permitted to remain in the liquid plastic for the period of time necessary to enable the desired thickness of coating to be built up, after which the component is removed from the plastic and placed in an oven where it is heated at a temperature of 350° F. for the length of time required for plasticization. The part may then be removed from the oven, and when removed is ready for casting.

In order to dip temperature sensitive parts, the use of a hot liquid plastic and the subsequent baking process is obviously inadvisable. For dipping components of this character, the components are first cleaned and rendered greasefree, and thereafter are dipped at room temperature into a water suspension of polyvinyl chloride, which is known commercially by the trade name "Geon Latex 31X," and after being dipped, is removed and permitted to dry at room temperature, or at slightly higher temperature, for a length of time necessary for the complete evaporation of water from the coating. Successive dips may be made to build up the coating to the desired thickness, which may be in the neighborhood of 3 to 5 thousandths of an inch, and after the coating has been thoroughly dried the part is ready for casting.

As an alternative and preferred method the components are cleaned and rendered grease-free, after which they are dipped in a mixture of silicone rubber and carbon tetrachloride. The preferred silicone rubber is that sold by Dow Corning Company, under the trade name Silastic 160, and the mixture referred to is composed preferably of approximately 35% Silastic 160 and 65% carbon tetrachloride, although these proportions may be departed from considerably with no untoward effects. The mixture of Silastic 160 and carbon tetrachloride is agitated mechanically from 3 to 4 hours, or until the mixture is creamy smooth, and free of lumps. Thereafter the components which are to be potted are dipped in the mixture, to form a coating layer. The wet coating layer is air dried at about 80° C. for about 30 minutes, which drives off the carbon tetrachloride. Thereafter, if additional coating thickness is desired, the component is redipped and redried, following the original procedure. When the desired thickness of coating has been attained, i. e. from 3 to 5 thousandths of an inch, generally, the component with its coating is air dried at 150° C. for 30 minutes, and then cured at the curing temperature of the silicone rubber, i. e. about 225° C. for a period of about 2 hours. When curing has been completed the coated compound is ready for casting.

Referring now specifically to Figure 1 of the drawings, there is illustrated a miniature vacuum tube 1 having a glass envelope 2 containing various electrical elements 3 which are well known and commonly employed in the interior of electronic vacuum tubes, and comprising further a plurality of leads 4 for enabling electrical connection with the elements 3 internally of the tube. The reference numeral 5 denotes a coating of polyvinyl chloride, or of silicone rubber, resulting from an appropriate one of the coating forming processes which have been described immediately above, and which has a thickness preferably of 3 to 5 thousandths of an inch.

The same coating process may be applied not only to electronic vacuum tubes, but to any electrical component which has a coefficient of contraction substantially different from that of the resinous potting compound, and particularly it may be applied to metallic elements having any appreciable size, as for example, choke coils, transformers and the like.

In the case of electronic vacuum tubes, the glass envelope of the tube has substantially a zero coefficient of contraction or expansion with heat, while the resinous potting compound contracts relatively sharply with cooling and curing. Metallic elements, on the contrary, have a smaller coefficient of contraction with temperature than does the potting compound, and accordingly, tend to separate from the latter, introducing cracks in the potting compound which may extend entirely therethrough and render the final product pervious to moisture, and likely to crack and break up in response to shock.

Small relatively soft elements such as resistors, condensers, and the like have sufficient resilience, in and of themselves, to give under the strains introduced by the potting process, and do not normally require coating prior to casting.

After all the elements which are to be assembled on a common terminal board, as 6, Figure 2, and which require dipping, have been dipped and the requisite coating formed, the wiring process is completed, interconnecting the various elements such as the transformer 7 and the electronic vacuum tubes 8, 9 and 10, with the various resistors 11, and the condensers 12, and the entire terminal board 6 is then inserted in a liquid resinous compound, preferably a polyester type resinous casting compound, with the requisite leads 13 brought out externally of the casting. The entire casting is then permitted to cure at a slow rate, forming, eventually, a shockproof, rigid, non-hygroscopic covering for the electrical components.

It has been found in actual production work that application of my method provides highly effective potted electrical assemblies, which may be produced relatively rapidly and with substantially no spoilage, in contrast with the results which I have been able to obtain by the older methods known to me, and one of which is disclosed in the U. S. Patent to Ver Planck et al. #2,222,729.

The particular types of coating which I have utilized in the practice of my process are entirely compatible with the polyester type resins which I employ for the main casting, being chemically inert with respect thereto, and the casting is smooth and uniform throughout every element of volume thereof to and including the interface between the coating and the casting. Accordingly, the process results in no damage to fragile electrical components, by reason of shrinking of the potting resin nor does the potting resin pull away from potted metallic elements or crack, since the potting resin forms a bond with the resilient coating, which takes up volumetric differences between the metallic elements and the resin, introduced by the process of cooling and curing the castings.

Upon completion of the preparation of an article manufactured in accordance with my novel method, the resulting casting is found to be clear in color, completely uniform in mechanical structure, and free of all cracks and air bubbles, and fragile electrical components included in the castings are found to be free of damage caused by stresses and strains introduced by cooling and curing of the casting.

While I have described specific and preferred embodiments of my invention, it will be clear that variations of the described processes may be resorted to without departing from the true spirit and scope of my invention, as defined in the appended claims.

What I claim as new and desire to secure by Letters Patent of the United States is:

1. An article of manufacture, comprising a relatively fragile electrical component, a coating for said electrical component consisting of at least one layer of silicone rubber, said coating completely enveloping said component and in intimate contact therewith over the entire surface thereof, and a substantial quantity of polymerized casting resin in an infusible solid state encompassing said coating, the characters of said casting resin and of said coating being such that polymerization of said casting resin at the inter-face between said casting resin and said coating is complete, said polymerized casting resin being shock-proof, rigid and relatively non-hygroscopic, said casting resin having contractibility different from that of the electrical component during curing of the casting resin.

2. The combination in accordance with claim 1 wherein said electrical component is a miniature vacuum tube.

No references cited.